United States Patent
Hasumi et al.

(10) Patent No.: US 10,354,300 B2
(45) Date of Patent: Jul. 16, 2019

(54) ELECTRONIC COMMERCIAL TRANSACTION SUPPORT METHOD

(75) Inventors: Yoshitsugu Hasumi, Saitama (JP); Takashi Kawashima, Kanagawa (JP); Kazuo Imai, Tokyo (JP); Hirofumi Hayaashi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 1335 days.

(21) Appl. No.: 10/344,213

(22) PCT Filed: Jun. 5, 2002

(86) PCT No.: PCT/JP02/05556
§ 371 (c)(1),
(2), (4) Date: Sep. 2, 2003

(87) PCT Pub. No.: WO02/101614
PCT Pub. Date: Dec. 19, 2002

(65) Prior Publication Data
US 2004/0059682 A1  Mar. 25, 2004

(30) Foreign Application Priority Data
Jun. 11, 2001 (JP) ................. 2001-175431

(51) Int. Cl.
*G06Q 20/12* (2012.01)
*G06Q 30/04* (2012.01)
(Continued)

(52) U.S. Cl.
CPC ............. *G06Q 30/04* (2013.01); *G06Q 20/04* (2013.01); *G06Q 20/12* (2013.01); *G06Q 20/24* (2013.01);
(Continued)

(58) Field of Classification Search
CPC .................................................. G06Q 20/027
(Continued)

(56) References Cited

U.S. PATENT DOCUMENTS

RE33,688 E  * 9/1991 Tsukui ................ 235/379
5,723,067 A  * 3/1998 Mormann ........... C07D 251/34
252/299.01

(Continued)

FOREIGN PATENT DOCUMENTS

JP  11 015978 A   1/1999
JP  11-259616     9/1999
(Continued)

OTHER PUBLICATIONS

Official communication issued by Japan Patent Office, dated Sep. 25, 2012 for counterpart Japan Patent Application No. 2011-118975 (4 pages).
(Continued)

*Primary Examiner* — Chinedu C Agwumezie
(74) *Attorney, Agent, or Firm* — Xsensus LLP

(57) ABSTRACT

The present invention relates to an electronic-commerce assisting method capable of smoothly and securely conducting electronic commerce on a communication network, and to an electronic-commerce assisting server for realizing the same. The present invention is configured to have a communication terminal (2) for a person desiring to purchase a product, who connects to a cybershop (40) on a communication network (32) and who desires the purchase of a product using a credit card; an electronic-commerce server (46), disposed in the cybershop (40), for determining whether or not the electronic commerce should be concluded on the basis of the credit confirmation of the credit card; and an electronic-commerce assisting server (44) which requests the communication terminal (2) to transmit unique number data within the IC card (10) having a credit card function via the communication network (32), which converts the received unique number data into a credit card number in order to generate credit limit data of the credit card, and (Continued)

which transmits credit OK/NG data to the electronic-commerce server (46).

18 Claims, 6 Drawing Sheets

(51) Int. Cl.
*G06Q 20/04* (2012.01)
*G06Q 20/24* (2012.01)
*G06Q 20/34* (2012.01)
*G06Q 20/38* (2012.01)
*G06Q 20/40* (2012.01)
*G06Q 30/06* (2012.01)

(52) U.S. Cl.
CPC ......... *G06Q 20/341* (2013.01); *G06Q 20/352* (2013.01); *G06Q 20/382* (2013.01); *G06Q 20/385* (2013.01); *G06Q 20/4018* (2013.01); *G06Q 30/06* (2013.01)

(58) Field of Classification Search
USPC ................................................. 705/50, 76, 75
See application file for complete search history.

(56) References Cited

U.S. PATENT DOCUMENTS

| | | | | |
|---|---|---|---|---|
| 5,727,230 | A * | 3/1998 | Fujioka | G06K 7/0008 710/20 |
| 5,878,141 | A * | 3/1999 | Daly | G06Q 20/04 235/379 |
| 5,883,810 | A | 3/1999 | Chase et al. | |
| 5,899,980 | A | 5/1999 | Wilf et al. | |
| 5,903,721 | A | 5/1999 | Sixtus | |
| 6,023,682 | A | 2/2000 | Checchio | |
| 6,044,349 | A | 3/2000 | Tolopka et al. | |
| 6,070,154 | A | 5/2000 | Tavor et al. | |
| 7,096,204 | B1 * | 8/2006 | Chen et al. | 705/74 |
| 7,353,208 | B1 * | 4/2008 | Stambaugh | G06Q 20/04 380/247 |
| 7,523,067 | B1 * | 4/2009 | Nakajima | G06Q 20/10 705/39 |
| 2001/0051917 | A1 * | 12/2001 | Bissonette et al. | 705/39 |
| 2002/0002515 | A1 * | 1/2002 | Okazaki et al. | 705/27 |
| 2002/0016745 | A1 * | 2/2002 | Kuwahara et al. | 705/26 |
| 2002/0026355 | A1 * | 2/2002 | Mitsuoka | G06Q 30/02 705/14.16 |
| 2002/0032662 | A1 * | 3/2002 | Maclin et al. | 705/64 |
| 2003/0028481 | A1 * | 2/2003 | Flitcroft | G06Q 20/00 705/39 |
| 2003/0208439 | A1 * | 11/2003 | Rast | 705/38 |
| 2005/0228726 | A1 * | 10/2005 | Ito | G06Q 20/085 705/26.1 |
| 2006/0218098 | A1 * | 9/2006 | Walker | G06Q 20/04 705/50 |
| 2010/0100454 | A1 * | 4/2010 | Sines | G06Q 20/02 705/26.1 |

FOREIGN PATENT DOCUMENTS

| | | |
|---|---|---|
| JP | 2000-090157 | 3/2000 |
| JP | 2000-215279 | 8/2000 |
| JP | 2000-222541 | 8/2000 |
| JP | 2001-117976 | 4/2001 |
| JP | 2002-366868 | 12/2002 |
| JP | 4363800 | 8/2009 |
| WO | WO 96/08783 | 3/1996 |
| WO | WO 98/40809 | 9/1998 |
| WO | WO 99/08218 | 2/1999 |
| WO | WO 99/49424 | 9/1999 |
| WO | WO 99/66436 | 12/1999 |
| WO | WO 00/45349 | 8/2000 |
| WO | WO 00/74007 A1 | 12/2000 |
| WO | WO 01/09807 | 2/2001 |
| WO | WO 01/11513 A1 | 2/2001 |
| WO | WO 01/29637 A2 | 4/2001 |
| WO | WO 01/35355 A1 | 5/2001 |

OTHER PUBLICATIONS

Communication from Japanese Patent Office dated Dec. 7, 2010, for Japanese Application No. 2005-202119 (3 pages).
European Search Report in English, dated Apr. 29, 2010, issued in counterpart EP Application No. 02733321.0 (6 pages).
Rankl et al, "Handbuch derChipkarten," Hanser, Germany, XP002578172, Dec. 31, 1999, pp. 51-53.

* cited by examiner

FIG. 4

| UNIQUE NUMBER | NAME | CREDIT CARD NUMBER | BIRTHDAY INFORMATION | TELEPHONE NUMBER INFORMATION | SECURITY CODE | SURNAME AND FIRST NAME IN KATAKANA |
|---|---|---|---|---|---|---|
| derfffkorhhjjim43 | TARO YAMADA | aaaa-bbbb-cccc-dddd | 12/24/1962 | 813-1234-xxxx | abc | ヤマダ タロウ |
| 2gkhkls500anlvjh | HANAKO TANAKA | eeee-ffff-gggg-hghhh | 10/20/1960 | 813-1234-yyyy | def | タナカ ハナコ |
| gjeiutkgndb4823y | ICHIRO SUZUKI | iiii-jjjj-kkkk-llll | 02/04/1952 | 813-1234-zzzz | ghi | スズキ イチロウ |

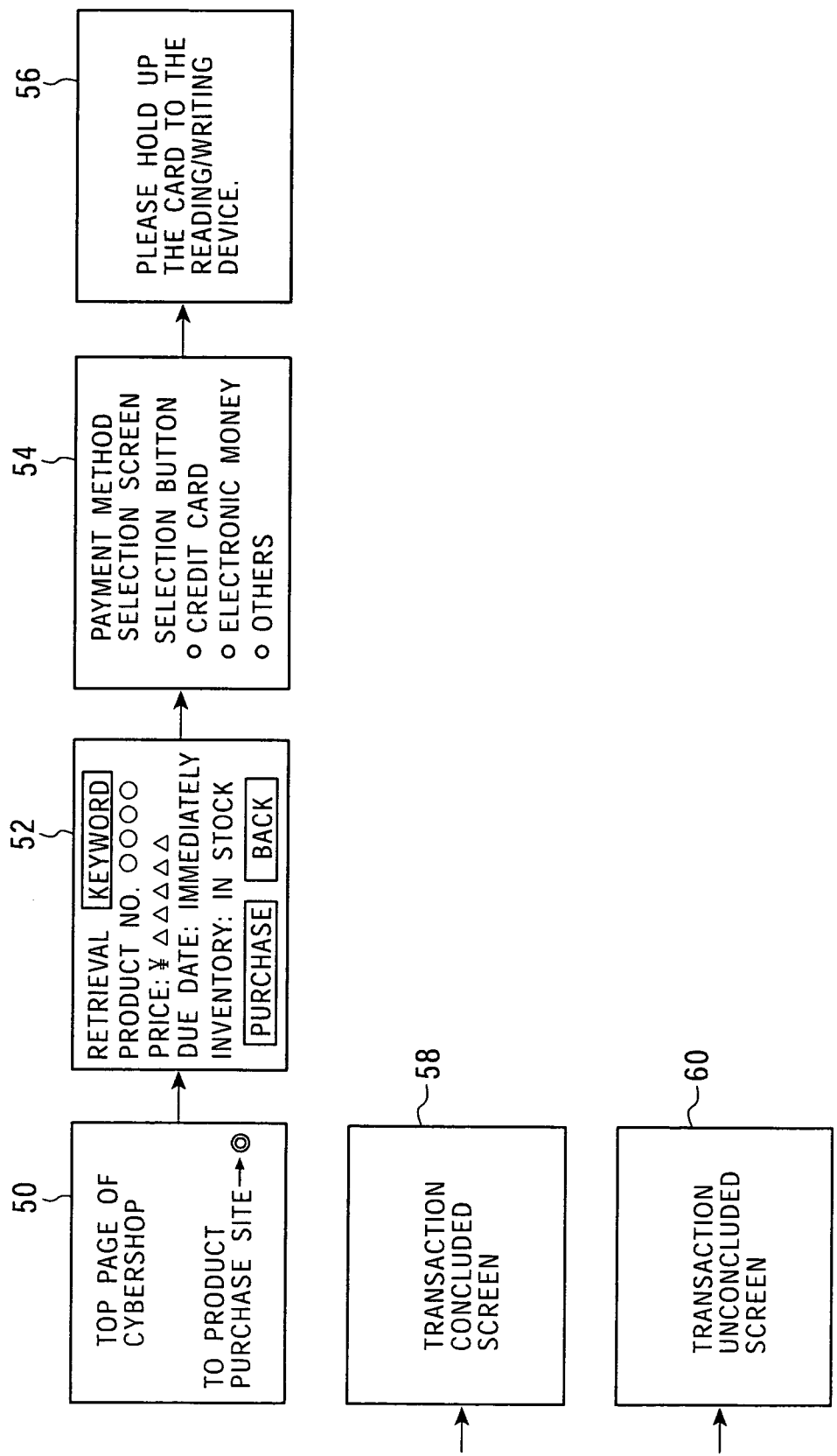

ELECTRONIC COMMERCIAL TRANSACTION SUPPORT METHOD

TECHNICAL FIELD

The present invention relates to an electronic-commerce assisting method capable of smoothly and securely conducting electronic commerce on a communication network such as the Internet, and to an electronic-commerce assisting server for realizing the electronic-commerce assisting method. More particularly, the present invention relates to an electronic-commerce assisting method, in which a person desiring to purchase a product can pay using a credit card without letting the credit card number become known to another person, and the cybershop can prevent losses due to "posing", wherein a credit card number is illegally obtained, thus reducing the risk of charge back, and to an electronic-commerce assisting server for realizing the electronic-commerce assisting method.

Furthermore, the present invention relates to an electronic-commerce assisting method, in which costs required for countermeasures against leakage of card information in a cybershop and an NSP (Network Service Provider) having a membership server in which card information of members is stored can be reduced, and to an electronic-commerce assisting server for realizing the electronic-commerce assisting method.

BACKGROUND ART

Electronic commerce, that is, buying and selling of products and services (hereinafter simply called as "products") in cybershops or cybermalls, which is one use of cyberspace constructed on a communication network such as the Internet, has become active.

Current electronic-commerce transactions are dominated by credit sales wherein payment is settled after a predetermined period of time has elapsed from when the product was purchased. When purchasing a product in a cybershop or a cybermall, a person desiring to purchase a product completes a product purchase procedure by inputting credit card information using a browser displayed on a display device provided in a communication terminal such as a personal computer (hereinafter referred to as a "PC").

The inputting of credit card information in electronic commerce is usually performed in such a manner that the person desiring to purchase a product inputs data of only the credit card number or both the credit card number and the card expiration date using the browser, and then transmits the data to the cybershop.

The cybershop transmits the received data of the credit card number, or the credit card number and the card expiration date to the credit card company via a dedicated line, etc. Based on the data, the credit card company confirms the validity of the credit card and the credit limit, and transmits the results to the cybershop. Based on the received confirmation results, the cybershop determines whether or not the product should be transferred. As a result, in electronic commerce, credit risk to the cybershop can be avoided.

Since the electronic commerce is conducted in cyberspace, and, unlike an actual shop, the person desiring to purchase a product and the shop are not face to face, forgery cannot be detected by actually confirming the credit card, and the signature written on the credit card cannot be verified. For this reason, it is very difficult for the cybershop to determine whether or not the credit card user in electronic commerce is a true user, and there is no effective means for preventing an illegal product purchase by someone illegally obtaining a credit card number of another person and posing as the card user (hereinafter referred to as "posing").

In this manner, there is no means for preventing fraud including illegally obtaining a credit card number by "posing". However, on the other hand, since the determining right for selling the product is on the shop side, the risk of charge back (refund) for making up money lost by a true credit card owner and a credit card company due to the payment settlement for illegally purchased products is imposed on the shop.

The charge-back risk on the cybershop in electronic commerce is higher than that in actual transactions. In particular, in online shopping in which products such as marketable commodities are handled, a very high charge-back risk is imposed on the shop.

The cybershop constructs and manages a membership information database in which the credit card numbers of the members are stored in such a manner as to be associated with membership IDs and passwords. A strict security system needs to be organized so that credit card numbers of members cannot be illegally disclosed to a malicious hacker (cracker), and the cost of maintaining and controlling the security system is high enough not to be ignored.

On the other hand, the true credit card owner has a risk in that, if the credit card number of the owner is illegally obtained and abused, the owner becomes involved in trouble caused through no fault of his/her own and unnecessary dispute.

The presence of such a risk becomes a large factor for preventing the widespread use of electronic commerce. Therefore, in order that the credit card number is not illegally obtained by another person on the Internet, for example, a technology for encrypting and transmitting credit card numbers (for example, SSL (Secure Socket Layer)) has been put into practical use. However, since the transmission data usually passes through a large number of unspecified nodes on the Internet until the data reaches its destination, simply by encrypting the data, it cannot be said that sufficient countermeasures against the risk of theft and falsification of data have been taken.

With respect to this, an NSP in which the following electronic-commerce assisting system is adopted has appeared. In this system, the membership IDs and the passwords of the registered members of the NSP are stored in the membership database in such a manner as to be associated with the credit card numbers.

When a member purchases a product in a cybershop which is affiliated with the corresponding NSP, the purchase procedure is completed by merely inputting the membership ID and the password. Based on the input membership ID and password, the NSP, instead of the cybershop, searches the membership database in order to specify the credit card number, requests the credit card company which handles the credit card to confirm the credit, and charges the credit card company on the basis of the credit card number. Since this system obviates the need for the cybershop to record and hold the credit card numbers of the members, the cybershop is released from the risk of the card numbers being disclosed due to access by a cracker.

However, in this system, in order that the membership IDs and passwords are associated with the credit card numbers, it is necessary to transmit the data of the credit card number to the corresponding NSP over the Internet when the card number is registered at the first time, when the credit card is changed, or when the card number is changed. Therefore, at that time, there is a risk of the credit card number being stolen and used on the Internet. In place of this data transmission, notification of the credit card number using a telephone or a facsimile is possible. However, this is not practical because the procedure is complex and time-consuming, and security problems are likely to occur because the data is updated through human intervention.

According to this system, although the leakage of credit card numbers from the cybershop can be prevented, a strict security system needs to be provided in the membership information database at the NSP so that credit card numbers of members cannot be illegally obtained by a malicious hacker (cracker), and the cost of maintaining and controlling the security system is so high that it cannot be ignored.

On the other hand, for the point of view of the credit card owner, even though the above-described system makes it possible to avoid the risk that the card number is disclosed on the network in individual electronic-commerce transactions, when the card number is registered in a plurality of NSPs, the credit card number of the owner exists in a distributed manner in a plurality of membership databases on the network in a manner similar to the conventional case in which the card owner may worry that there is an increased chance of the card number being stolen and used. In the case where the membership ID also serves as the electronic mail address, if only the password is disclosed, it is possible for a recipient receiving electronic mail from that member to take "posing". Consequently, a security problem occurs, and also a situation occurs in which the recipient becomes unnecessarily suspected and is given trouble.

In addition to the above-described system, the following Internet settlement system has been proposed. In this system, when a person desiring to purchase a product connects to the Internet via a predetermined NSP and purchases a product from a cybershop, the transaction is concluded after an authentication assisting server queries the NSP on the basis of the IP address of the person desiring to purchase a product in order to identify that person (U.S. Pat. No. 5,899,980 is a related invention). In this system, since a payment settlement using a credit card is not used, as long as this system is used, the credit card number data will not be disclosed and will not be stored anywhere on the Internet. However, since in this system, electronic commerce using credit cards is not presupposed from the beginning, the leakage of credit card numbers does not become a problem, and does not solve problems arising from electronic commerce on the presumption of the use of credit cards on a communication network.

An object of the present invention is to provide an electronic-commerce assisting method capable of smoothly and securely conducting electronic commerce on a communication network, and an electronic-commerce assisting server for realizing the electronic-commerce assisting method.

Another object of the present invention is to provide an electronic-commerce assisting method in which a person desiring to purchase a product can pay using a credit card without letting the credit card number become known to another person, and an electronic-commerce assisting server for realizing the electronic-commerce assisting method.

Another object of the present invention is to provide an electronic-commerce assisting method capable of reducing the risk of charge back in a cybershop in credit sales in electronic commerce, and an electronic-commerce assisting server for realizing the electronic-commerce assisting method.

Another object of the present invention is to provide an electronic-commerce assisting method capable of reducing costs required for countermeasures against leakage of card information in a cybershop and an NSP having a membership server in which card information of members is stored, and an electronic-commerce assisting server for realizing the electronic-commerce assisting method.

DISCLOSURE OF THE INVENTION

The aforementioned object can be achieved by an electronic-commerce assisting server for assisting a user in the purchase of products or services, the electronic-commerce assisting server comprising: a management section for managing credit card numbers and unique numbers differing from the credit card numbers stored in a credit card in such a manner that these are associated with each other for each user; a transmission section for transmitting an instruction for a settlement to the user when a request of the settlement associated with the purchase is received; and a settlement section for performing a settlement by converting the unique number received in such a manner as to correspond to the instruction into a credit card number inside the management section.

In the electronic-commerce assisting server of the present invention, the management section further manages personal attribute information in such a manner as to be associated therewith, the instruction for a settlement containing an instruction for requesting an input of the personal attribute information, and the settlement section performs personal identification authentication using the personal attribute information received in such a manner as to correspond to the input, and performs a settlement.

In the electronic-commerce assisting server of the present invention, the personal information contains one or more of the telephone number information, the name information, the birthday information, and the security code of the user.

The aforementioned object can be achieved by a settlement method performed on a computer used by a user when products or services are purchased, the settlement method comprising: a step of receiving an instruction for a settlement associated with the purchase; a step of operating a credit card in accordance with the instruction and transmitting a unique number differing from a credit card number stored in the credit card to an electronic-commerce assisting server; and a step of receiving the result in which a settlement is performed using the credit card number associated with the unique number in the electronic-commerce assisting server.

The aforementioned object can be achieved by an electronic-commerce assisting method for assisting a user in the purchase of products or services, the electronic-commerce assisting method comprising the steps of: managing credit card numbers and unique numbers differing from the credit card numbers stored in a credit card in such a manner that these are associated with each other for each user; transmitting an instruction for a settlement to the user when a request of the settlement associated with the purchase is received; and performing a settlement by converting the unique number received in such a manner as to correspond to the instruction into a credit card number inside the management section.

The electronic-commerce assisting method of the present invention further comprises the step of: managing personal attribute information in such a manner as to be associated therewith, the instruction for the settlement containing an instruction for requesting an input of the personal attribute information; and performing personal identification authentication using the personal attribute information received in such a manner as to correspond to the input, and performing a settlement.

In the electronic-commerce assisting method of the present invention, the personal information contains one or more of the telephone number information, the name information, the birthday information, and the security code of the user.

The aforementioned object can be achieved by an electronic-commerce assisting program for assisting a user in the purchase of products or services, the electronic-commerce assisting program comprising the steps of: managing credit card numbers and unique numbers differing from the credit card numbers stored in a credit card in such a manner that these are associated with each other for each user; transmitting an instruction for a settlement associated with the purchase to the user when a request of the settlement associated with the purchase is received; and performing a settlement by converting the unique number received in such a manner as to correspond to the instruction into a credit card number inside the management section.

The electronic-commerce assisting program of the present invention further comprises the steps of: managing personal attribute information in such a manner as to be associated therewith, the instruction for the settlement containing an instruction for requesting an input of the personal attribute information; and performing personal identification authentication using the personal attribute information received in such a manner as to correspond to the input, and performing a settlement.

In the electronic-commerce assisting program of the present invention, the personal information contains one or more of the telephone number information, the name information, the birthday information, and the security code of the user.

BRIEF DESCRIPTION OF THE DRAWINGS

FIG. 4 shows an example of data within a customer database in the electronic-commerce assisting server 1 according to the embodiment of the present invention.

FIG. 6 shows an example of a screen displayed on a browser of the communication terminal 2 of a person desiring to purchase a product in each operation procedure of the electronic-commerce assisting server 1 according to the embodiment of the present invention.

BEST MODE FOR CARRYING OUT THE INVENTION

Referring to FIGS. 1 through 6, a description will be given of an electronic-commerce assisting method and an electronic-commerce assisting server for realizing the electronic-commerce assisting method according to an embodiment of the present invention. The overall configuration of the electronic-commerce assisting server according to this embodiment will be described first with reference to FIG. 1.

Figure 1:
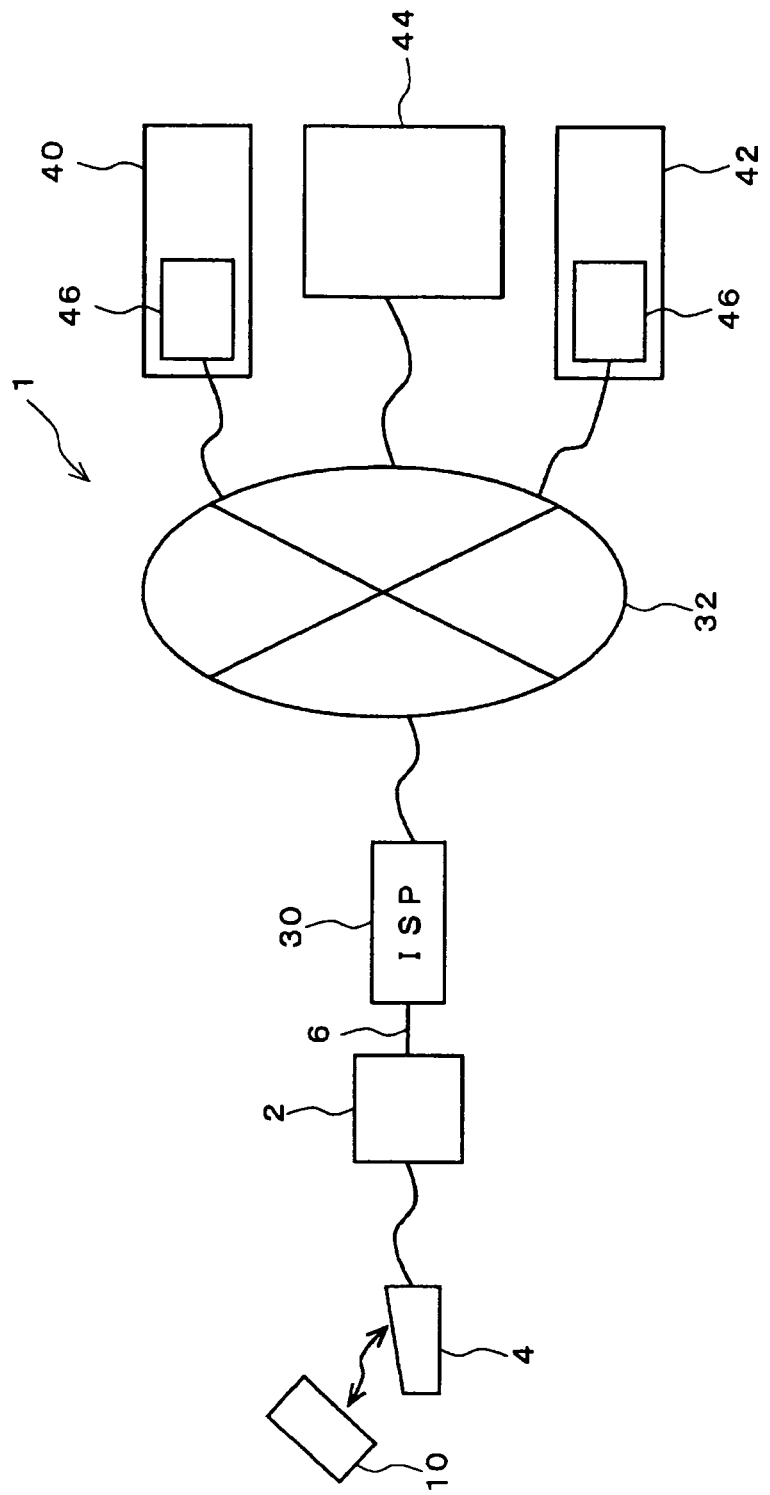
FIG. 1 shows the network configuration in an electronic-commerce assisting server 1 according to an embodiment of the present invention.

FIG. 1 shows the network configuration in the embodiment of the present invention. As shown in FIG. 1, in an electronic-commerce assisting server 1 according to this embodiment, cybershops 40 and 42 (two shops are shown as an example in FIG. 1) which are connected to a communication network and which are opened in cyberspace, and a communication terminal (one communication terminal is shown as an example in FIG. 1) 2 of a person desiring to purchase a product, who accesses the cybershops 40 and 42, etc., in order to purchase a product, exist.

A communication network 32 is a network of either a domestic or an international value-added communication network (VAN), or in which these are combined. As a combined example of a domestic and an international value-added communication network, there is the so-called Internet. Furthermore, for example, a communication network containing a digital public telephone line, such as a packet communication network and ISDN, which is used to transfer data in a cellular phone, etc., as a component of the network, is also included. Furthermore, a communication network in which a digital television broadcast network (including both wireless and wired communication such as a cable television), a public telephone line, etc., are linked, is also included. In the manner described above, the communication network 32 of this embodiment has a wide concept including one of these various forms of communication broadcast networks and a combined unit thereof.

For example, when the communication network 32 is the Internet, the communication terminal 2 of the person desiring to purchase a product is a work station or a PC having an electronic-mail transmission/receiving function and a browser function, and the communication terminal 2 is connected to the communication network 32 through an ISP (Internet service provider (one form of NSP)) 30 via a communication line 6 such as a dedicated line or a public line. The browser has a function for accessing a predetermined URL (Uniform Resource Locator) on the Internet and for displaying a home page. The communication terminal 2 of the person desiring to purchase a product is able to obtain product information by accessing the cybershops 40 and 42 on the Internet via the browser and to transmit the intent of purchasing a product.

The cybershops 40 and 42 has an electronic-commerce server 46 for processing various requests relating to the purchase of products from the communication terminal 2 of the person desiring to purchase a product, so that product information can be provided to the communication terminal 2 of the person desiring to purchase a product on the Internet, and data for carrying on with a product purchase procedure is transmitted to or received from the communication terminal 2 of the person desiring to purchase a product.

Furthermore, for example, when the communication network 32 is a network including a packet communication network, the communication terminal 2 of the person desiring to purchase a product is a cellular phone having an electronic-mail transmission/receiving function and a browser function, so that data can be transmitted to or received from the cybershops 40 and 42 via the packet communication network.

With remarkable advances in information technology (IT) in recent years, a use of a communication network using PCs has become easy. Furthermore, electronic commerce using the communication terminal 2 including at least one of a cellular phone, a personal handyphone system (PHS (registered trademark)), and a portable information terminal has come to be conducted frequently and extensively, and services in which cellular phones are used as connection terminals for the Internet have already started. For example, in i-mode (registered trademark of NTT DoCoMo, Inc.) provided by NTT DoCoMo, Inc., a cellular phone having a browser function is connected to the Internet via an i-mode server in order to access the cybershops 40 and 42, making it possible to purchase a product.

In the electronic-commerce assisting system according to this embodiment, furthermore, an electronic-commerce assisting server 44 is connected to the communication network 32. The electronic-commerce assisting server 44 responds to an authentication assisting request output from the cybershops 40 and 42 via the communication network 32. Based on the IP address of the communication terminal 2 of the person desiring to purchase a product, sent from the cybershops 40 and 42 together with the authentication assisting request, the electronic-commerce assisting server 44 allows the browser of the communication terminal 2 to display a screen for requesting the output of credit card information. It is possible for the electronic-commerce assisting server 44 to specify the card number of the credit card on the basis of the received credit card information.

For this purpose, the electronic-commerce assisting server 44 includes a management section for managing credit card numbers and unique numbers differing from the credit card numbers stored in a credit card in such a manner that these are associated with each other for each user; a transmission section for transmitting an instruction for a settlement to the user when a request of the settlement associated with the purchase is received; and a settlement section for performing a settlement by converting the unique number received in such a manner as to correspond to the instruction into a credit card number inside the management section.

Based on the specified credit card number, the management section of the electronic-commerce assisting server 44 accesses an authentication database (not shown) disposed within a credit card company, searches for credit OK/NG data of that credit card stored in the authentication database, generates the credit OK/NG data of the credit card of that card number, and transmits the data to the cybershops 40 and 42 from the transmission section.

Here, between the cybershops 40 and 42 and the electronic-commerce assisting server 44, in addition to the connection by the communication network 32, a dedicated-line connection, an OBN (Open Business Network) connection, or an Internet VPN connection may be selected. OBN is an IP (Internet Protocol) service dedicated to businesses, disconnected from the Internet. OBN has a low cost, and a high-level security comparable to that of a dedicated line and high-speed communication using a wide band can be obtained in almost the entire area of Japan. The Internet VPN is a service in which the Internet can be used like a dedicated network. Although it is easy to make an overseas connection, there are cases in which the security is lower and the band is narrower compared to the above-described dedicated line and OBN.

Figure 2:
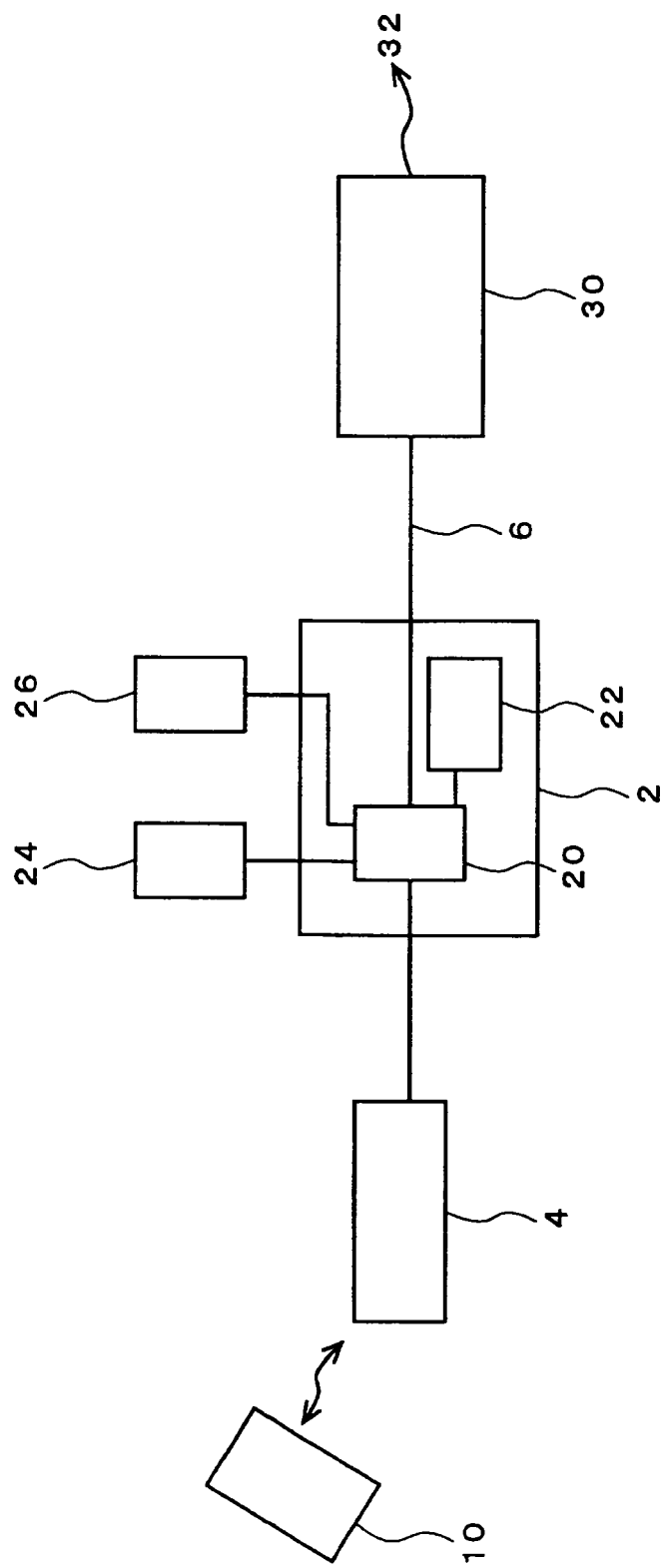
FIG. 2 shows the overall configuration of a communication terminal 2 in the electronic-commerce assisting server 1 according to the embodiment of the present invention.

Next, referring to FIG. 2, the overall configuration of the communication terminal 2 according to this embodiment will be described. The communication terminal 2 is connected to an ISP 30 via the communication line 6. A reading/writing device 4 for reading/writing various types of data from and into a storage device of the IC card 10 having a credit card function is connected to the communication terminal 2.

The communication terminal 2 has a display device 24 for displaying a browser screen and a printing device 26 for printing the screen. Also, the communication terminal 2 has a control section 20 for centrally controlling all the devices and for performing various computation processes, and a storage device 22 for storing various types of data. The control section 20 stores various types of data of the IC card 10, input from the reading/writing device 4, into the storage device 22, reads predetermined data from the storage device 22, and performs a computation thereon.

Figure 3:
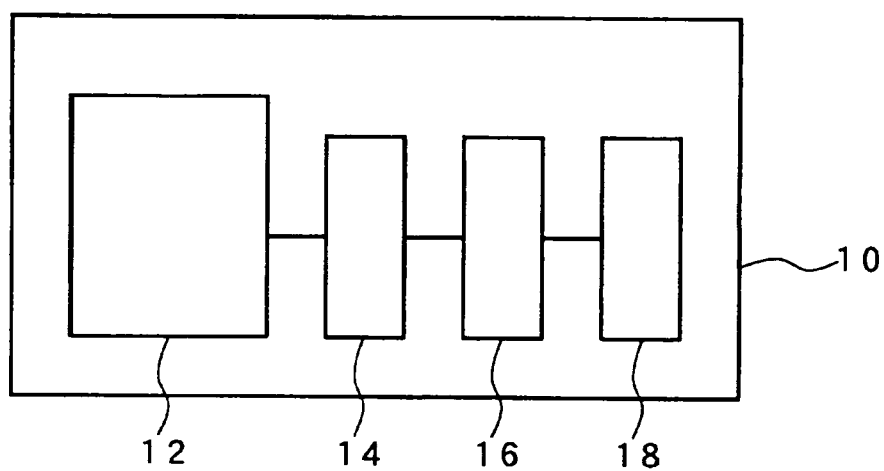
FIG. 3 shows the overall configuration of an IC card 10 used in the electronic-commerce assisting server 1 according to the embodiment of the present invention.

FIG. 3 shows the overall configuration of the IC card 10 according to the embodiment. The IC card 10 has a credit card function. The IC card 10 has a storage device 12 formed of a semiconductor memory such as a flash EEPROM, a communication control section 16 and an antenna 18 for performing communication with the outside in a non-contact manner in order to transmit/receive data, and a control section 14 for centrally controlling them.

When the IC card 10 is held above the reading/writing device 4, transmission/reception of data using electromagnetic waves is performed between the antenna 18 of the IC card 10 and the antenna (not shown) within the reading/writing device 4. The electromagnetic-wave data has been encrypted by triple DES in which, for example, an encryption process based on a data encryption standard which is made public by U.S. National Bureau of Standards is performed in triple.

The storage device 12 within the IC card 10 has stored therein unique number data for the electronic-commerce assisting server 44 to specify the credit card number of the card. The unique number data is written into the storage device 12 when the IC card 10 is issued from a credit card issuing company. The unique number is, for example, a code sequence, in which alphanumeric characters of about 16 to 24 digits coexist, which is formed of codes which have a one-to-one correspondence to the credit card number, but differ from that number.

At least the unique number data is sent as the credit card information to the electronic-commerce assisting server 44. Of course, the card expiration date, other personal identification information, and so on may be added as the credit card information. When a network other than a communication network of CAFIS, such as OBN, is to be used, personal attribute information other than the credit card number can be transmitted. In that case, as in the customer database shown in FIG. 4, the electronic-commerce assisting server 44 manages credit card numbers and unique numbers differing from the credit card numbers in such a manner as to be associated with each other, and also manages the personal attribute information in such a manner as to be associated therewith. The personal attribute information is attribute information associated with the owner of the credit card, for example, birthday information (4-digit information of the year of birth, 8- or 6-digit information of the date of birth), telephone number information (including the whole or a part), a security code, and name information (including one or more combinations of surname in katakana, first name in katakana, surname written in English, and first name written in English). The phrase "manages in such a manner as to be associated with each other" may be such that, as shown in FIG. 4, the above may be managed by one database, and a plurality of databases may be used by using certain key information (for example, customer numbers (not shown), unique numbers, and credit card numbers) as in an RDB (Relational Database).

In this case, personal attribute information is not stored in the storage device 12 of the IC card. When the electronic-commerce server 46 instructs an operation of the credit card (the screen 56 of FIG. 6), a screen (e.g., a pop-up window) for instructing an input of personal attribute information is displayed together with the screen 56 of FIG. 6 so as to request the user to input the personal attribute information. In this case, the personal attribute information to be input may be one or more of the above. Furthermore, the number of pieces of personal attribute information to be input may be determined on the basis of the amount of the purchase. For example, for more than 2000 yen, one piece of personal attribute (security code) may be input, and for more than 4000 yen, two pieces of personal attribute (security code and birthday information) may be input.

When the personal attribute information input by the user is received, the electronic-commerce assisting server 44 determines whether or not the input personal attribute information matches the information managed by the customer database illustrated in FIG. 4, and the electronic-commerce assisting server 44 may not allow the settlement when the whole or a part of the information (e.g., birthday information) does not match. When they match, the electronic-commerce assisting server 44 performs a settlement process. As a result of the above, even if a malicious third party obtains the credit card itself, since the malicious third party does not know the personal attribute information, a settlement process is not performed, and thus a more secure transaction environment can be provided to the user.

Figure 5:
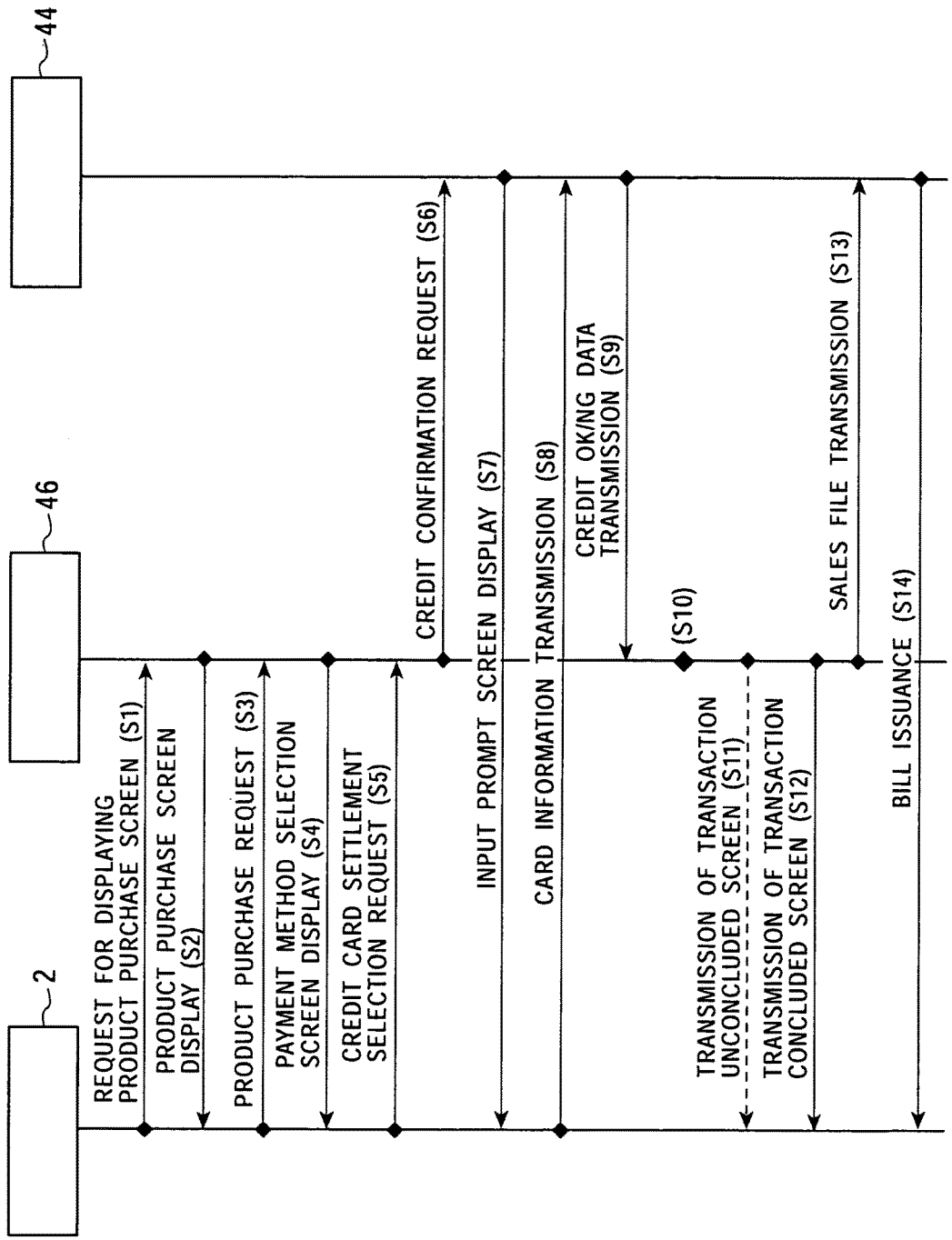
FIG. 5 chronologically shows the procedure of electronic commerce in the communication terminal 2 of a person desiring to purchase a product and an electronic-commerce server 46 in a cybershop in the electronic-commerce assisting server 1 according to the embodiment of the present invention.

While referring to FIGS. 1 through 4, the operation procedure in the electronic-commerce assisting server 1 having the above configuration will now be described further with reference to FIGS. 5 and 6. A description will now be given by using an example in which a person desiring to purchase a product operates the communication terminal 2 so as to connects to the cybershop 40 which provides a home page for electronic commerce on the communication network 32 (assumed to be the Internet). FIG. 5 chronologically shows the procedure of electronic commerce in the communication terminal 2 of a person desiring to purchase a product and the electronic-commerce server 46 and the electronic-commerce assisting server 44 in the cybershop 40 in the electronic-commerce assisting server 1 according to this embodiment. FIG. 6 shows examples of the screen displayed on the browser of the communication terminal 2 of the person desiring to purchase a product in each operation procedure.

Initially, the person desiring to purchase a product allows a Web browser to be displayed on the display device 24 of the communication terminal 2, and inputs a predetermined URL for the cybershop, so that a top page 50 of the cybershop shown in FIG. 6 is displayed via the communication network 32. Next, the person desiring to purchase a product positions the pointer of the mouse in, for example, a "product purchase site" button shown in the top page 50 and clicks the mouse button, so that a product purchase screen display request is sent (step S1).

The electronic-commerce server 46 receiving the product purchase screen display request displays a product purchase screen 52 shown in FIG. 6 on the browser of the communication terminal 2 (step S2). When the person desiring to purchase a product inputs the retrieval keyword of a desired product from the product purchase screen 52 on the communication terminal 2, the electronic-commerce server 46 searches the product database (not shown) on the basis of the retrieval keyword input by the person desiring to purchase a product, and displays the searching result on the product purchase screen 52.

When the person desiring to purchase a product has found the desired product on the product purchase screen 52 displayed on the browser of the communication terminal 2, the person positions the pointer of the mouse in "purchase" and clicks the mouse button, so that a product purchase request is sent to the electronic-commerce server 46 (step S3).

The electronic-commerce server 46 of the cybershop receiving the product purchase request transmits the data of a payment method selection screen 54, shown in FIG. 6, for selecting a payment method, so that the data is displayed on the browser of the communication terminal 2 (step S4). Here, if the person desiring to purchase a product selects a payment settlement using a credit card, a credit-card settlement selection request is sent to the electronic-commerce server 46 (step S5).

When the credit-card settlement selection request is received, the electronic-commerce server 46 sends out a credit confirmation request together with the IP address of the communication terminal 2 of the person desiring to purchase a product to the electronic-commerce assisting server 44 (step S6).

Based on the IP address of the communication terminal 2 of the person desiring to purchase a product, associated with the authentication assisting request, the electronic-commerce assisting server 44 transmits the data of an input prompting screen 56 of "Please hold up the card to the reading/writing device", shown in FIG. 6, to the communication terminal 2, whereby the data is displayed on the browser of the communication terminal 2 (step S7).

When the person desiring to purchase a product holds up the IC card 10 to the reading/writing device 4, at least the unique number data within the credit card information stored in the storage device 12 of the IC card 10 is received, as electromagnetic data encrypted by triple DES, by the reading/writing device 4. The encrypted unique number data received by the reading/writing device 4 is temporarily decrypted, then, an encryption process by SSL is performed thereon, and the resulting data is transmitted from the communication terminal 2 to the electronic-commerce assisting server 44 (step S8).

After the electronic-commerce assisting server 44 decrypts the received unique number data, the electronic-commerce assisting server 44 specifies the card number of the credit card from the unique number data. The electronic-commerce assisting server 44 has a correspondence table of unique numbers and credit card numbers stored, for example, in a storage device (not shown), and based on the correspondence table, the electronic-commerce assisting server 44 specifies the card number of the credit card from the unique number data.

Based on the specified credit card number, the electronic-commerce assisting server 44 accesses an authentication database disposed inside the credit card company, searches for the credit OK/NG data of the credit card, stored in the authentication database, and generates credit OK/NG data of the credit card of that card number. Next, the electronic-commerce assisting server 44 transmits to the cybershop 40 the generated credit OK/NG data to which unique number data corresponding to the credit card number is attached (step S9).

Based on the received credit OK/NG data, the electronic-commerce server 46 of the cybershop 40 determines whether or not the credit of the card is allowed to conclude an electronic-commerce transaction (step S10).

When it is determined in step S10 that the credit cannot be allowed, a transaction unconclusion screen 60, shown in FIG. 6 is displayed on the browser of the communication terminal 2 so as to ask the person desiring to purchase a product as to whether this processing should be terminated so as to cause the product transaction to be unconcluded, or the price should be paid by another method (step S11 indicated by the broken line in FIG. 5).

When it is determined that the credit can be allowed, a transaction conclusion screen 58, shown in FIG. 6, is displayed on the browser of the communication terminal 2 (step S12). Nearly in synchronization with the display of the transaction conclusion screen 58, the electronic-commerce server 46 of the cybershop 40 creates a sales file, and transmits to the electronic-commerce assisting server 44 the sales file to which the unique number data is attached (step S13).

In the electronic-commerce assisting server 44, the unique number data of the received sales file is converted into the credit card number, the settlement result is transmitted to the user, and when a predetermined deadline is reached for the credit sales volume by the card, the settlement section of the electronic-commerce assisting server 44 issues a bill for the person who has purchased the products (step S14).

As has been described in the foregoing, in this embodiment, since the unique number data instead of the credit card number is disclosed on the communication network 32, the credit card number of the person desiring to purchase a product is not disclosed on the communication network 32, including the cybershops 40 and 42, and the ISP 30, or the credit card number is not stored in any node. Furthermore, also in the electromagnetic data communication between the IC card 10 and the reading/writing device 4, the unique number data leaks, and the credit card number is not transmitted or received.

As a result, the credit card owner can avoid the risk of the card number being disclosed on the communication network 32 and being stolen and used in individual electronic-commerce transactions. Furthermore, even if membership registration is made in a plurality of ISPs 30 and cybershops 40 and 42, the credit card number of the owner is not stored in a plurality of membership information databases connected to the communication network 32. Therefore, it is possible to greatly reduce the risk of the card number being stolen and used.

According to this embodiment, in electronic commerce, among those other than the true owner of the credit card, it is only the electronic-commerce assisting server 44 that can handle the credit card number. Furthermore, it is only the authentication database (not shown) of the credit card company, which can be accessed by only the electronic-commerce assisting server 44, where the credit card number is stored. That is, if the assisting system according to this embodiment is used, an electronic-commerce system, in which the possibility of the credit card number being illegally obtained by a third party is considerably reduced, can be realized.

According to this embodiment, it is not necessary for individual cybershops 40 and individual ISPs 30 to construct and manage a membership information database in which credit card numbers of members are stored in such a manner as to be associated with member IDs and passwords. As a result, it is possible to greatly reduce the cost of maintaining and managing the security system for preventing illegal leakage of credit card numbers by a cracker.

In the manner described above, according to this embodiment, it is possible to realize an IC card by which electronic commerce on a communication network can be conducted smoothly and securely, and an electronic-commerce assisting method and system using the IC card. This makes it possible to make a payment which feels secure when using a credit card without letting the credit card number become known to another person in the electronic commerce.

According to this embodiment, it is possible to reduce the risk of charge back in cybershop, which occurs by an illegal electronic-commerce transaction as a result of "posing" in which the credit card number is illegally obtained. Furthermore, it is possible to reduce costs required for countermeasures against leakage of card information in a cybershop and an NSP having a membership server in which card information of members is stored.

The present invention is not limited to the above-described embodiments, and various modifications are possible.

For example, although in the above-described embodiments, the electronic-commerce assisting server 44 requests unique number data from the communication terminal 2, this may be executed instead by the electronic-commerce server 46 of the cybershop 40.

However, the above-described embodiments in which the electronic-commerce assisting server 44 directly obtains unique number data have a higher security. In particular, when other credit card information, such as the card expiration date, the personal authentication data, and so on, is to be requested, preferably, the method of this embodiment in which the electronic-commerce assisting server 44 directly receives the transmission data from the communication terminal 2 is adopted.

The electronic-commerce assisting server 44 of the above-described embodiments specifies the card number of the credit card from the received unique number data on the basis of the correspondence table of unique numbers and credit card numbers, but the present invention is not limited to this example. Of course, for example, the following method may be used in which a unique number is derived from the credit card number by using a predetermined algorithm and is stored in the IC card, and the credit card number is specified from the unique number data by a procedure reverse to the above.

An IC card in which unique number data is stored is issued from a specific credit card company. When the need to present, input, or transmit the credit card number occurs when a credit card is used in a shop which is not affiliated therewith, of course, the credit card number may be displayed on the surface of the IC card.

In the above-described embodiments, although a description is given by using a non-contact IC card as an example, the present invention is not limited to this example, and of course can be applied to a contact-type IC card. In this case, transmission/reception of data is performed by bringing the data reading/writing terminals of an IC card into contact with the data input/output terminals of a dedicated reading/writing device.

As described above, according to the present invention, it is possible to smoothly and securely conduct electronic commerce on a communication network.

According to the present invention, payment using a credit card can be conducted without letting the credit card number become known to another person in electronic commerce.

In addition, according to the present invention, it is possible to reduce the risk of charge back in a cybershop in credit sales in electronic commerce.

Furthermore, costs required for countermeasures against leakage of card information in a cybershop and an NSP having a membership server in which card information of members is stored can be reduced.

The invention claimed is:
1. An electronic commercial transaction device comprising a processor and a memory storing executable instructions that when executed by the processor cause the processor to perform the steps of:
    receiving a unique number sent from a communication terminal;
    storing the unique number in the memory, the unique number being usable for more than one transaction and having a one-to-one correspondence with a credit card number of an integrated circuit (IC) card, the IC card having a credit card function and a semiconductor memory;
    transmitting data of a selection screen to the communication terminal for displaying the selection screen on a display of the communication terminal for user selection of a payment method of the selection screen and user input of personal attribute information;
    receiving, from the communication terminal a credit confirmation request and the unique number for the credit card number of the IC card after personal attribute information associated with a user of the IC card is input;
    retrieving the credit card number associated with the unique number;
    accessing an authentication database of a credit card company based on the credit card number;
    receiving credit data associated with the credit card number from the credit card company;
    transmitting, when the credit data is OK, a transaction conclusion data to the communication terminal and transmit a settlement instruction to the communication terminal, wherein the communication terminal displays the settlement instruction to the user of the IC card;
    transmitting, when the credit data is not OK, a transaction unconclusion data to the communication terminal; and
    sending, when a settlement selection request is received, a credit confirmation request together with an IP address of the communication terminal of the user, who desires to purchase a product, to an electronic-commerce assisting server,
    wherein based on the IP address, the electronic-commerce assisting server transmits data of an input prompting screen requesting the user to hold up the IC card to a reading/writing device to the communication terminal, causing display of the input prompting screen by the communication terminal.
2. The electronic commercial transaction device according to claim 1, wherein the processor is further configured to
    store the personal attribute information associated with the user; and
    perform a personal identification authentication process based on the personal attribute information received in response to an input request to the user that requests the user to input the personal attribute information.
3. The electronic commercial transaction device according to claim 2, wherein the personal attribute information includes at least one of a telephone number, a name, a birthday, and a security code of the user.
4. The electronic commercial transaction device according to claim 1, wherein the semiconductor memory stores the unique number issued from the credit card company.
5. The electronic commercial transaction device according to claim 4, wherein the IC card further includes a communication circuit coupled with the semiconductor memory.
6. The electronic commercial transaction device according to claim 5, wherein the unique number stored in the semiconductor memory is wirelessly transmitted to the communication terminal.
7. The electronic commercial transaction device according to claim 1, wherein the processor is further configured to send, in response to the credit confirmation request, an input request to the user that requests the user to input personal attribute information including at least a security code and name information of the user including combinations of (i) a part of a name of the user in a first language and (ii) at least another part of the name in a second language.
8. The electronic commercial transaction device according to claim 1, wherein the processor is further configured to
    store personal attribute information associated with the user; and
    perform a personal identification authentication process based on the personal attribute information received in response to an input request to the user that requests the user to input the personal attribute information.
9. The electronic commercial transaction device according to claim 1, wherein the processor is further configured to receive encrypted data from the communication terminal, the encrypted data further includes an expiration date associated with the IC card.
10. The electronic commercial transaction device according to claim 1, wherein the unique number includes at least 16 consecutive alphanumeric characters.
11. The electronic commercial transaction device according to claim 1, wherein the processor is further configured to send, in response to the credit confirmation request, an input request to the user that requests the user to input personal attribute information, a number of items of the personal attribute information requested in the input request increases with a number of purchase transactions made by the user.
12. An electronic commercial transaction device, comprising a processor and a memory storing executable instructions that when executed by the processor cause the processor to perform the steps of:
    receiving a unique number sent from a communication terminal;
    storing the unique number in the memory, the unique number corresponding to a credit card number of an integrated circuit (IC) card, the IC card having a credit card function and a semiconductor memory;
    transmitting data of a selection screen to the communication terminal for displaying the selection screen on a display of the communication terminal for user selection of a payment method of the selection screen and user input of personal attribute information;
    receiving, from the communication terminal, a credit confirmation request and the unique number for the credit card number of the IC card after personal attribute information associated with a user of the IC card is input;
    retrieving the credit card number associated with the unique number;
    accessing an authentication database of a credit card company based on the credit card number;
    receiving credit data associated with the credit card number from the credit card company;
    transmitting, when the credit data is OK, a transaction conclusion data to the communication terminal and transmit a settlement instruction to the communication terminal, wherein the communication terminal displays the settlement instruction to the user of the IC card;

transmitting, when the credit data is not OK, a transaction unconclusion data to the communication terminal; and sending, when a settlement selection request is received, a credit confirmation request together with an IP address of the communication terminal of the user, who desires to purchase a product, to an electronic-commerce assisting server, wherein based on the IP address, the electronic-commerce assisting server transmits data of an input prompting screen requesting the user to hold up the IC card to a reading/writing device to the communication terminal, causing display of the input prompting screen by the communication terminal.

13. The electronic commercial transaction device according to claim 12, wherein the processor is further configured to send, in response to the credit confirmation request, an input request to the user that requests the user to input personal attribute information including at least a security code and name information of the user including combinations of (i) a part of a name of the user in a first language and (ii) at least another part of the name in a second language.

14. The electronic commercial transaction device according to claim 12, wherein the semiconductor memory stores the unique number issued from the credit card company.

15. The electronic commercial transaction device according to claim 14, wherein the IC card further includes a communication circuit coupled with the semiconductor memory.

16. The electronic commercial transaction device according to claim 15, wherein the unique number stored in the semiconductor memory is wirelessly transmitted to the communication terminal.

17. The electronic commercial transaction device according to claim 12, wherein the processor is further configured to receive encrypted data from the communication terminal, the encrypted data further includes an expiration date associated with the IC card.

18. The electronic commercial transaction device according to claim 12, wherein the unique number includes at least 16 consecutive alphanumeric characters.

* * * * *